United States Patent [19]

Lalonde

[11] 4,388,771
[45] Jun. 21, 1983

[54] HUB CAP DISPLAY DEVICE

[76] Inventor: Louis A. Lalonde, 3470 Stanley, Apt. 902, Montreal, Quebec, Canada

[21] Appl. No.: 140,145

[22] Filed: Apr. 14, 1980

[51] Int. Cl.³ ............... G09F 21/04; G09F 11/02; B60B 7/00
[52] U.S. Cl. ............... 40/587; 40/493; 301/37 N
[58] Field of Search ............... 40/587, 493; 301/37 N

[56] References Cited

U.S. PATENT DOCUMENTS

| | | | |
|---|---|---|---|
| 1,756,021 | 4/1930 | Escasena | 40/587 |
| 1,832,605 | 11/1931 | Zallio | 40/587 |
| 2,629,957 | 3/1953 | Lyon | 40/587 |
| 3,155,430 | 11/1964 | Schindler | 40/587 |
| 3,426,463 | 2/1969 | Weisenbach | 40/587 |
| 3,511,541 | 5/1970 | Spisak | 40/587 |
| 3,769,729 | 11/1973 | Engler | 40/587 |

Primary Examiner—Robert A. Hafer
Assistant Examiner—Michael J. Foycik
Attorney, Agent, or Firm—Larson and Taylor

[57] ABSTRACT

A decorative display device for a hub cap of a vehicle wheel is disclosed. The device is sealed which prevents dirt preventing it from rotating and allows minor scrapes without damage. The device has a sealed housing having at least one transparent face adapted for mounting on a hub cap with transparent face directed outwards, a disc within the housing free to rotate therein, the disc having a design or the like visible through the transparent face of the housing, the disc being weighted on one side such that the disc rotates at least when the hub cap is stationary, so that the design or the like is in a constant attitude.

1 Claim, 8 Drawing Figures

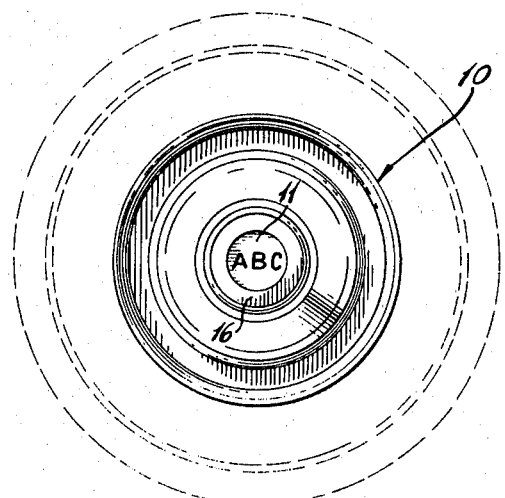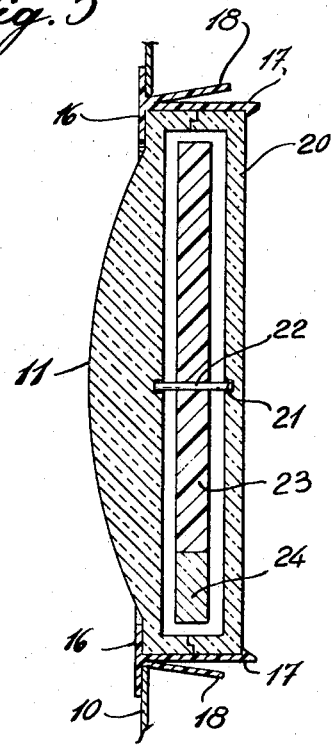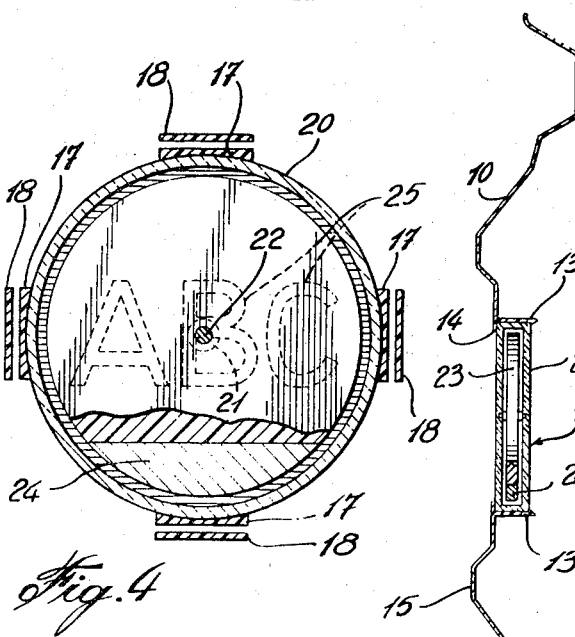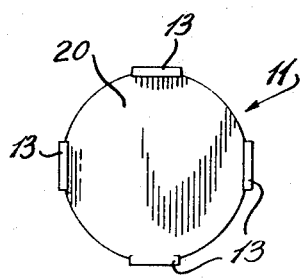

HUB CAP DISPLAY DEVICE

The present invention relates to a decorative display device for a hub cap on a vehicle wheel. More particularly the display device is weighted on one side so that it always returns to the same position when the wheel stops rotating so that the message or design on the display device is always the same way up.

Display devices which have messages, advertising slogans, cartoons, names, initials, etc. have been used for mounting on hub caps of wheels. These display devices are either rotatable or nonrotatable. The rotatable devices are weighted on one side so that when the wheel stops moving the display device rotates to maintain a constant attitude representing the message or design being the right way up for reading. In the past, however, such rotatable devices have been mounted on the outside of the hub cap and have had no external protection, thus when the wheel of a vehicle passes through snow or mud, invariably the display device becomes clogged with mud, sand, snow and the like, and no longer rotates. In some cases the devices become distorted or bent due to the wheel hub scraping along the curb of a road. The display device then becomes nothing more than a plain sign and loses its unique rotating feature.

I have discovered that I can make a display device for the hub cap of a vehicle wheel which is contained within a sealed housing having at least one transparent side so that a rotating disc within the housing is not prevented from rotating by mud, snow, sand and the like, and all that need be done is to occasionally wash the transparent side of the housing so that the disc containing the message or design thereon is always visible. Furthermore, the sealed housing can withstand minor scrapes without damaging the disc or preventing it from rotating. This rotating disc may be pivoted at its centre, rotate on rollers or balls at its periphery, or float in a liquid, and is weighted on one side so that the message or design on the disc always assumes a constant attitude when the wheel becomes stationary so that the message or design is the right way up. The display device may be positioned on the axis of the wheel or may be mounted anywhere on the hub cap. If desired, several units may be mounted on the hub cap.

The present invention provides a display device for a hub cap of a vehicle wheel comprising a sealed housing having at least one transparent face adapted for mounting on a hub cap with the transparent face directed outwards, a disc within the housing free to rotate therein, the disc having a design or the like visible through the transparent face of the housing, the disc being weighted on one side such that the disc rotates at least when the hub cap is stationary, so that the design or the like is in a constant attitude.

In further embodiments of the display device, the disc has an axial pin which fits into holding apertures on opposing inside faces of the housing allowing the disc to rotate freely. The disc may be circular and a plurality of freely rotating means, such as rollers, balls or pins, are provided at the periphery of the disc to allow free rotation. In another embodiment the disc is circular, and the housing has a circular interior larger in diameter than the disc. Liquid is contained within the housing such that the disc floats therein without touching the top or bottom of the housing and is free to rotate within the housing.

The display device may be incorporated with a hub cap having an aperture therein and clips integral therewith to hold the display device or may include a frame which has clips to hold the display device, the frame adapted to fit into an aperture in a hub cap. The sealed housing is preferably formed from transparent plastic. In another embodiment the transparent face of the sealed housing may have a convex exterior face.

In drawings which illustrate the embodiments of the invention:

FIG. 1 is a front view of a hub cap showing a display device according to one embodiment of the present invention on a vehicle wheel.

FIG. 2 is a cross sectional view through the hub cap and display device shown in FIG. 1.

FIG. 3 is a rear view of the hub cap illustrated in FIG. 1 showing clips holding the display device.

FIG. 4 is a front view, partially in section, of a display device according to another embodiment of the present invention.

FIG. 5 is a cross sectional view through the display device shown in FIG. 4 illustrating a holding frame.

Figure 6:
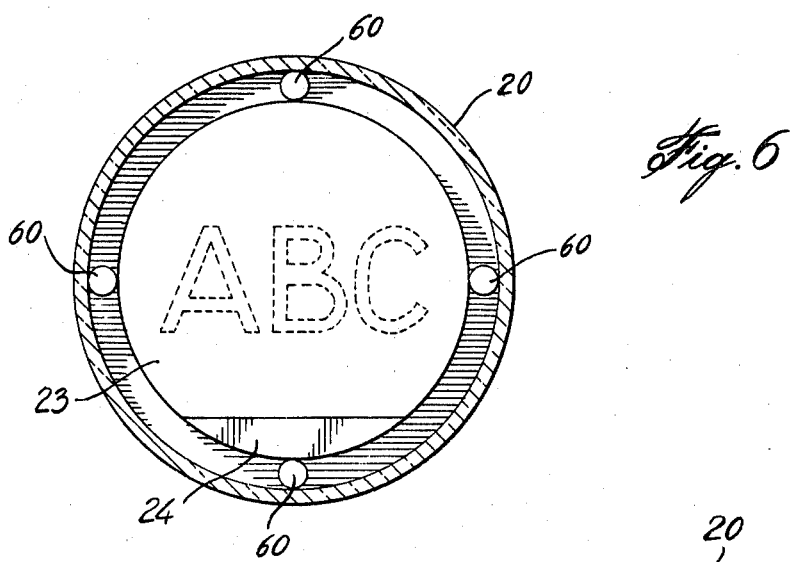
FIGS. 6, 7 and 8 are front views of other embodiments of display devices.

Referring now to the drawings, a hub cap 10 is shown having a display device 11 at the centre with letters displayed therein. Although the embodiment shown has letters, it will be apparent that the design or message could be an advertisement, cartoon figure, logo or even part of a design which includes the complete hub cap. The particular design or message does not form part of the invention. The design or message always remains upright when the wheel is stationary.

As shown in FIGS. 1, 2 and 3 the display device 11 is held to the back of the hub cap 10 by four clips 13 which are formed integral with the hub cap 10 and position the display device 11 so an aperture 14 is centred over the display device to see the unit. The clip 13 may be pulled back and the display device 11 removed and replaced with another unit. The hub cap 10 has a raised rim 15 surrounding the display device 11 to act as a guard and prevent scrapes and scratches to the unit. This rim 15 is not always present in hub caps. The hub cap may be made from sheet metal or plastic and generally has clips (not shown) at the periphery to hold the hub cap to a wheel rim.

In FIGS. 4 and 5 another arrangement for mounting the display device 11 is shown wherein an annular plastic frame 16 has four clips 17 which hold the display device 11 to the frame and then each clip 17 has a further back spring clip 18 which holds the frame 16 in the aperture of the wheel hub 10. The frame 16 allows a round hold to be cut in any standard wheel hub 10 so that a display device 11 may be fitted.

The details of the display device are shown in FIGS. 4 and 5 wherein a clear plastic housing 20 is formed in two circular dish portions with flanges joined together around the periphery to form a hollow cylindrical housing. The sides in the embodiment shown in FIG. 2 are flat, however, in the embodiment shown in FIG. 5 the transparent front side is convex. The sides may have either a concave or convex curve. A convex curve can produce a slight magnifying effect on the design within the housing. At the central axis of the housing 20 in FIG. 5 is a holding aperture 21 on the inside surface of each side of the housing 20, and into these two apertures fits an axial pin 22 which rotates freely therein. A circular disc 23 smaller in diameter than the inside of the housing has the axial pin 22 passing through the centre and attached to the disc 23 and both the axial pin 22 and disc 23 are sealed within the housing 20. The apertures 21 are larger in diameter than the axial pin 22 and allow some sideways movement so that there is little or no frictional resistance to stop the disc 23 rotating. The axial pin 22 may be made from metal or rigid plastic. One side edge of the disc 23 has a weight 24 thereon, and a design or message 25 as shown in FIG. 4 is provided on the outer facing side of the disc 23. The weight 24 is always at the bottom when the display device is stationary so that the design 25 remains in a constant attitude at least when the hub cap is stationary. Some rotation of the disc may occur when the wheel is rotating fast. The main purpose of the display device is for the design or message 25 to regain this constant attitude so that it can be read when the wheel is stationary.

The sealed housing 20 is preferably made from clear plastic, although only one face need be transparent, that is the face that is directed outwards away from the wheel. Thus the design 25 is always visible when one looks at the hub cap of the wheel. When the rotating disc 23 is placed within the housing 20, the sealing step is carried out in a dry atmosphere to ensure that moisture is not retained. Plastic adhesive or cement is suitable for the sealing step. The sealed housing is waterproof so that no moisture or other impurities can enter into the sealed housing which could fog up the transparent face and eventually prevent rotation of the disc.

Figure 7:
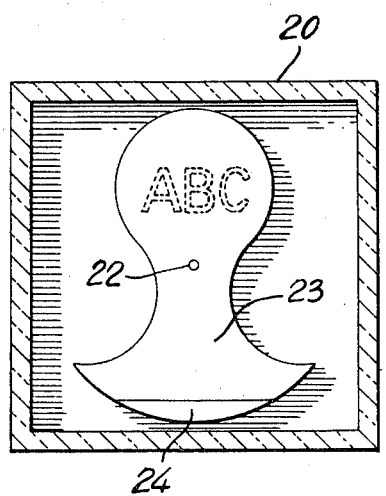
Figure 8:
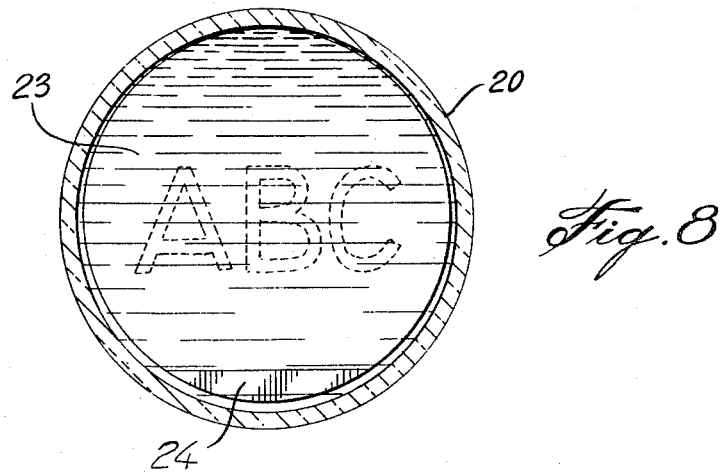

FIG. 6 illustrates another design of display device wherein the circular disc 23 has no axial pin but rotates on four free rotating balls, pins or rollers 60. Thus the pin 22 as shown in FIG. 5 does not interfere with the design on the disc 23. In FIG. 7 the disc 23 is not round and neither is the housing 20. However, the disc has to be free to rotate about the axial pin 22 within the housing 20. Liquid is contained within the housing 20 shown in FIG. 8. The liquid is preferably anti-freeze or at least has a low freezing temperature below ambient temperatures. The disc 23 is weighted to float in the centre of the housing, not touching the top or bottom of the housing and the weight 24 on one side of the disc 23 always turns to the bottom of the disc.

The disc is generally made of a plastic material. The design on the disc may be the initials of an individual so that personalized display devices are supplied. The design or message may be an advertisement, a picture, or any other form of writing which is preferably read one side up and thus always retains a constant attitude when the wheel is stationary. The hub cap may be made from plastic, metal or rubber. In a preferred embodiment the sealed housing 20 can be removed from the clips in the hub cap or the separate frame and replaced with a different display device. Although only four clips are shown in the drawings, more or less clips could be used, and the shape of the exterior of the housing 20 may be made to fit into clips or other attachment devices on the hub cap. This allows variations in initials or designs for a new owner of a vehicle, or allows the design in the display device to be changed without changing the hub cap. Display devices of the present invention may be available in local motor accessories stores and the like. They may be fitted to automobiles, vans, trailers, recreational vehicles and even horse drawn sulkies.

The embodiments of the invention in which an exclusive property or privilege is claimed, are defined as follows:

1. A display device for a hub cap of a vehicle wheel comprising:
    a water-proof, permanently and imperviously sealed housing having a circular front wall, a circular back wall, and a peripheral wall joining the front and back walls together, at least the front wall being transparent, and the inner surface of the front wall being parallel to the inner surface of the back wall; means for mounting the sealed housing on a hub cap with the front wall directed outward; a circular disc within the housing, the disc having a front surface and a rear surface, and a design or the like on its front surface visible through the front wall of the housing; means for rotatably mounting the disc within the housing with its front surface parallel to the front wall of the housing and its rear surface parallel to the rear wall of the housing, the mounting means comprising a mounting depression in the center of both the front and rear walls of the housing, the depression in each wall extending inwardly into the wall, but not through, from the inner surface of the wall, and an axle fixed to the center of the disc and projecting into each depression whereby the disc is freely, rotatably mounted between the housing walls in a manner which prevents leakage into the sealed housing; and a weight in a peripheral portion of the disc between its front and rear surfaces to rotate the disc to a constant attitude when the hub cap stops rotating.

* * * * *